US012770012B2

(12) United States Patent
Agravante et al.

(10) Patent No.: US 12,770,012 B2
(45) Date of Patent: Oct. 20, 2026

(54) LEARNING NEURO-SYMBOLIC WORLD MODELS

(71) Applicant: International Business Machines Corporation, Armonk, NY (US)

(72) Inventors: Don Joven Ravoy Agravante, Tokyo (JP); Daiki Kimura, Midori-ku (JP); Michiaki Tatsubori, Oiso (JP)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 18/073,651

(22) Filed: Dec. 2, 2022

(65) Prior Publication Data

US 2024/0185081 A1 Jun. 6, 2024

(51) Int. Cl.

| | |
|---|---|
| ***G06N 20/00*** | (2019.01) |
| ***G06F 40/205*** | (2020.01) |
| ***G06F 40/30*** | (2020.01) |
| ***G06N 3/042*** | (2023.01) |
| ***G06N 3/092*** | (2023.01) |

(52) U.S. Cl.

CPC ........... *G06N 3/092* (2023.01); *G06F 40/205* (2020.01); *G06F 40/30* (2020.01); *G06N 3/042* (2023.01)

(58) Field of Classification Search

CPC ........ G06N 3/092; G06N 3/042; G06N 3/006; G06N 3/044; G06N 3/045; G06N 3/08; G06N 7/01; G06F 40/205; G06F 40/30

See application file for complete search history.

(56) References Cited

U.S. PATENT DOCUMENTS

| | | | |
|---|---|---|---|
| 12,260,328 B2 | 3/2025 | Kimura et al. | |
| 2018/0260700 A1 | 9/2018 | Nagaraja et al. | |
| 2020/0191896 A1* | 6/2020 | Valencia | G01S 5/0284 |
| 2021/0174240 A1 | 6/2021 | Chakraborti et al. | |
| 2021/0232857 A1* | 7/2021 | Jung | G06F 18/41 |
| 2021/0319344 A1* | 10/2021 | Tang | G06F 40/30 |
| 2022/0147876 A1* | 5/2022 | Dalli | G06N 3/0895 |
| 2022/0180166 A1 | 6/2022 | Wachi et al. | |

(Continued)

OTHER PUBLICATIONS

Oltramari, Alessandro, et al. "Neuro-symbolic architectures for context understanding." arXiv preprint arXiv:2003.04707 (2020) ( Year: 2020).*

(Continued)

*Primary Examiner* — Andrew T McIntosh

(74) *Attorney, Agent, or Firm* — Harrity & Harrity, LLP

(57) ABSTRACT

Mechanisms are provided for a model-based Reinforcement Learning (RL) computing system. A proprioception module receives a previous state of an environment and a previous action taken by an agent in the environment, and estimates a current state by using a transition model which receives a pair of state and action and produces a next state. The proprioception module modifies an estimate of the transition model so that the modified estimate of the transition model prevents a past invalid action from recurring in a corresponding state, where the past invalid action taken in the corresponding state is one that did not cause a change in state. The proprioception module passes the current state and the modified estimate of the transition model to a model-based RL computer model for generation of a next action to take in the environment.

20 Claims, 5 Drawing Sheets

(56) References Cited

U.S. PATENT DOCUMENTS

2023/0311001 A1* 10/2023 Gordon .................. A63F 13/67
463/42

OTHER PUBLICATIONS

Hitzler, Pascal, and Md Kamruzzaman Sarker, eds. "Neuro-symbolic artificial intelligence: The state of the art." (2022) (Year: 2022).*
Bonzon, Pierre. "Towards neuro-inspired symbolic models of cognition: linking neural dynamics to behaviors through asynchronous communications." Cognitive neurodynamics 11.4 (2017): 327-353 (Year: 2017).*
No Author "Call for Main Conference Papers", Conference on Empirical Methods in Natural Language Processing 1 (EMNLP 2022), 2022, 11 pages, https://2022.emnlp.org/calls/main_conference_papers/.
Adhikari, Ashutosh et al., "Learning Dynamic Belief Graphs to Generalize on Text-Based Games", 34th Conference on Neural Information Processing Systems (NeurIPS 2020), Vancouver, Canada, Dec. 2020, 13 pages.
Ammanabrolu, Prithviraj et al., "Playing Text-Adventure Games with Graph-Based Deep Reinforcement Learning", Proceedings of NAACL-HLT 2019, pp. 3557-3565 Minneapolis, Minnesota, Jun. 2-Jun. 7, 2019.
Anonymously, "Neuro-Symbolic RL Agent with a PDDL Symbolic Layer", IP.com No. IPCOM000265952D, IP.com Electronic Publication Date: May 28, 2021, 5 pages.
Chaudhury, Subhajit et al., "Neuro-Symbolic Approaches for Text-Based Policy Learning", Proceedings of the 2021 Conference on Empirical Methods in Natural Language Processing, pp. 3073-3078 Nov. 7-11, 2021.
Chitnis, Rohan et al., "Learning Neuro-Symbolic Relational Transition Models for Bilevel Planning", arXiv: 2105.14074v3 [cs.AI] Jun. 30, 2022, 8 pages.
Cong, Lin et al., "Reinforcement Learning With Vision-Proprioception Model for Robot Planar Pushing", Frontiers in Neurorobotics, www.frontiersin.org, Mar. 2022 vol. 16 Article 829437, 11 pages.
Cote, Marc-Alexandre et al., "TextWorld: A Learning Environment for Text-based Games", arXiv:1806.11532v2 [cs.LG] Nov. 8, 2019, 29 pages.
Drozdov, Andrew et al., "Inducing and Using Alignments for Transition-based AMR Parsing", arXiv: 2205.01464v1 [cs.CL] May 3, 2022, 13 pages.
Evans, Richard et al., "Learning Explanatory Rules from Noisy Data", Journal of Artificial Intelligence Research 61 (2018) 1-64, published Jan. 2018, 64 pages.
Hausknecht, Matthew et al., "Interactive Fiction Games: A Colossal Adventure", arXiv: 1909.05398v3 [cs.AI] Feb. 25, 2020, 20 pages.
Helmert, Malte, "The Fast Downward Planning System", Journal of Artificial Intelligence Research 26 (2006) 191-246, published Jul. 2006.
Kimura, Daiki et al., "LOA: Logical Optimal Actions for Text-based Interaction Games", arXiv: 2110.10973v1 [cs.AI] Oct. 21, 2021, 5 pages.
Kimura, Daiki et al., "Neuro-Symbolic Reinforcement Learning with First-Order Logic", arXiv: 2110.10963v1 [cs.AI] Oct. 21, 2021, 7 Pages.
Lang, Tobias et al., "Exploration in Relational Domains for Model-based Reinforcement Learning", Journal of Machine Learning Research 13 (2012) 3725-3768; Published Dec. 2012, 44 pages.
Muggleton, Stephen et al., "Inductive Logic Programming: Theory and Methods", The Journal of Logic Programming vols. 19-20, Supplement 1, May-Jul. 1994, pp. 629-679.
Murugesan, Keerthiram et al., "Text-based RL Agents with Commonsense Knowledge: New Challenges, Environments and Baselines", arXiv:2010.03790v1 [cs.AI] Oct. 8, 2020, 14 pages.
Narasimhan, Karthik et al., "Language Understanding for Text-based Games using Deep Reinforcement Learning", Proceedings of the 2015 Conference on Empirical Methods in Natural Language Processing, pp. 1-11, Lisbon, Portugal, Sep. 17-21, 2015.
Pasula, Hanna M. et al., "Learning Symbolic Models of Stochastic Domains", Journal of Artificial Intelligence Research 29 (2007) 309-352 Submitted Jun. 2006; published Jul. 2007.
Riegel, Ryan et al., "Logical Neural Networks", arXiv:2006.13155v1 [cs.AI] Jun. 23, 2020, 48 pages.
Sen, Prithviraj et al., "Neuro-Symbolic Inductive Logic Programming with Logical Neural Networks", arXiv: 2112.03324v1 [cs.AI] Dec. 6, 2021, 10 pages.
Torabi, Faraz et al., "Imitation Learning from Video by Leveraging Proprioception", Proceedings of the Twenty-Eighth International Joint Conference on Artificial Intelligence (IJCAI-19), Aug. 2019, 7 pages.
Tuthill, John C. et al., "Primer. Proprioception", Current Biology Magazine 28, R187-R207, Mar. 5, 2018, 10 pages.

* cited by examiner

LEARNING NEURO-SYMBOLIC WORLD MODELS

BACKGROUND

The present application relates generally to an improved data processing apparatus and method and more specifically to an improved computing tool and improved computing tool operations/functionality for automatically dispatching regulated and/or segmented workloads in a cloud computing environment based on previous experience and feedback.

Neuro-symbolic artificial intelligence (AI) computing systems integrate neural and symbolic AI architectures to address complementary strengths and weaknesses of each, providing a robust AI capable of reasoning, learning, and cognitive modeling. Deep learning best handles the first kind of cognition while symbolic reasoning best handles the second kind. Both are needed for a robust, reliable AI that can learn, reason, and interact with humans to accept advice and answer questions. Neuro-symbolic AI computing systems attempt to emulate the way in which human minds learn and understand the world around them. Neuro-symbolic AI computing systems, also referred to as a neuro-symbolic agent (NeSA), are built based on the observation that human minds do not just see patterns but also understand the world through models that are developed over time from an early age where these models represent the world in terms of objects and agents, and interactions between objects and agents, and where these other agents may have their own models which may be the same or different from that of the NeSA.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a computer-implemented method, in a model-based Reinforcement Learning (RL) computing system is provided. The method comprises receiving, by a proprioception module, a previous state of an environment and a previous action taken by an agent in the environment, and estimating, by the proprioception module, a current state by using a transition model which receives a pair of state and action and produces a next state. The method also comprises modifying, by the proprioception module, an estimate of the transition model so that the modified estimate of the transition model prevents a past invalid action from recurring in a corresponding state. The past invalid action taken in the corresponding state did not cause a change in state. Moreover, the method comprises passing, by the proprioception module, the current state and the modified estimate of the transition model to a model-based RL computer model for generation of a next action to take in the environment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
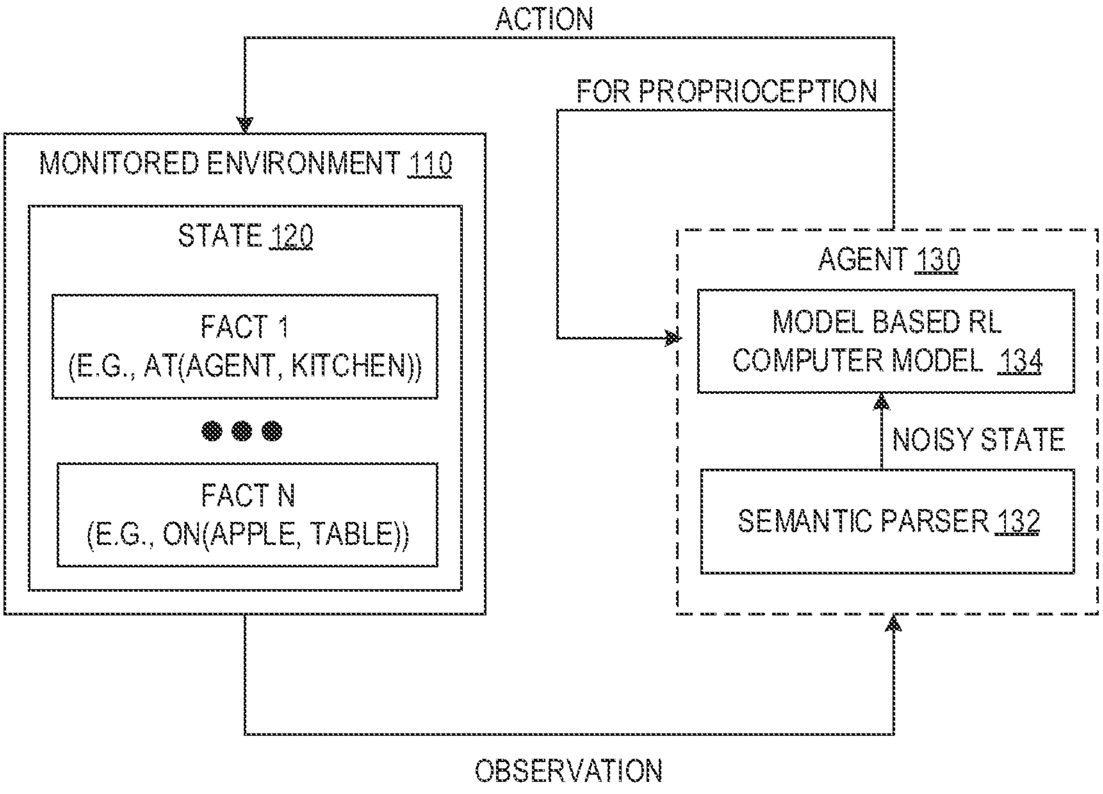
FIG. 1 provides an overview of a model-based reinforcement learning (RL) computer tool in accordance with one illustrative embodiment.

Neuro-symbolic (NS) approaches provide mechanisms to perform complex artificial intelligence (AI) operations, such as natural language-based sequential decision making. The available NS computing systems, however, use logical model-free reinforcement learning methodologies, meaning that while the NS approach may utilize machine learning computer models to perform their AI operations, the NS approach does not operate on a "world model" that defines the way in which entities operate within that environment, especially with regard to actions performed on, performed by, or performed with, those entities. For example, such a world model may be transition models that describe what the next state of an entity will be given a current state and action to take in this current state. Such transition models may be deterministic or stochastic and may be approximated with learning methods, e.g., neural networks and the like. That is, model-free NS approaches produce decisions or results without any explicit representation of the environment or world as a transition model.

The reinforcement learning (RL) of NS approaches may be improved by merging the model-free capabilities of the NS approach with an environment or world model (hereafter referred to collectively as a world model), to thereby leverage the knowledge present in the world model to make improved decisions or results of the NS computer model.

The model-based approach using the world model provides improved explainability, i.e., human understandable reasoning, as illustrated by benchmarks involving text-based game environments, such as TextWorld (available from Microsoft Corporation) which is an open-source extensible engine that generates and simulates text games, Microsoft's open-source Jericho engine, and TextWorld Commonsense (TWC) available from International Business Machines (IBM) Corporation of Armonk, New York, which are far more complicated to solve without reasoning and common sense represented in a world model, as compared to model-free approaches. Thus, by integrating a world model into the learning and operation of an NS computer model, improved training and ultimate decisions/results are generated because the knowledge represented in the world model informs the decisions made and makes them more likely to select actions that optimize beneficial results, e.g., rewards, within the operating environment.

For purposes of the following description, it will be assumed that the world model is represented as a transition model, where this transition model may be an explicitly defined state transition diagram data structure based model or may be an AI planning language based model, such as planning domain definition language (PDDL) based model, which is a more programmatic representation of the environment or world. In addition, while the environment or world may take many different forms, for the present description, it will be assumed that the environment or world is a text-based game, such as TextWorld, Jericho, or TWC, in which agents, actions, rewards, states, etc., of the world are represented in text, as this example provides a good benchmark for demonstrating the improvements achieved by incorporating a world model into the AI machine learning training of NS computer models. However, it should be appreciated that additional practical applications include determining textual and/or audible responses in chatbot environments to inputs from human users, controlling robotic devices by determining actions for the robotic device to perform within a given environment to achieve a desired result, and the like. In the case of virtual computer environments, various software based monitoring applications may monitor the virtual computer environment and provide observation data upon which the illustrative embodiments may operate. In the case of a physical environment, the physical environment may be monitored using various monitoring equipment including sensors, cameras, and the like, that provide observation data upon which the illustrative embodiments may operate.

The illustrative embodiments focus on the problem of learning logical world models in NS computing systems. Using the text-based game example implementation, a primary issue to address is how the NS computing system can learn such world models for text-based games using a semantic parser and initial knowledge base, e.g., set of one or more knowledge graph data structures. In contrast to understanding the world state in a latent space, the illustrative embodiments explicitly use the logical world models to plan optimal action sequences and to provide direct explainability of the decision making policy. To achieve this, the illustrative embodiments provide a proprioception computer model that operates on the output of the semantic parser that specifies the current state of the environment, as determined from a semantic analysis of textual descriptions from the environment or world, maintained historical state data, and one or more transition models. The proprioception computer model generates updated state information and transition models based on these inputs and provides the updated state information and transition model as input to the NS computing model. The NS computing model uses the output of the semantic parser, historical data regarding past results, e.g., rewards, achieved through past actions, to make a decision as to an action to take within the environment or world, e.g., the text-based game. In this process, the transition model is improved through learning transitions between states for entities based on actions, and their corresponding results, or rewards.

An overview of one illustrative embodiment is provide in FIG. 1. As shown in FIG. 1, the left side of the diagram represents that the monitored environment 110 has a state 120 that can be sufficiently approximated as a set of logical facts, e.g., facts 1 to N. The monitored environment 110 is any environment in which sequential decision problems are to be solved by the model-based reinforcement learning (RL) computer model 134, which in the example is a neuro-symbolic (NS) computer model, such as a deep learning (DL) computer model, recurrent neural network (RNN) based computer model, logical neural network (LNN) computer model, or other machine learning trained computer model. Examples of the monitored environment 110 may be a text-based game, a voice-based or text-based chatbot conversation with a user, a physical environment that may be represented as data structures, such as based on a computer vision capturing of the state of the physical environment, or the like.

Continuing in the bottom right of FIG. 1, the agent 130, i.e., the computer model that makes decisions about actions to take given an input of states and rewards/goals, can get textual observations of the environment, e.g., a textual statement "You are in the kitchen. You see an apple on the table", or the like, from the monitored environment 110. In a chatbot based monitored environment 110, for example, these observations may be human input from a customer, for example, for which the automated chatbot mechanisms needs to provide a response. These observations may specify an ideal state, i.e., where all information about the state is present from the observations, or noisy, i.e., there are inaccuracies in the observations or missing information from the observations.

A semantic parser 132 of the agent 130 converts these observations into a logical form, e.g., the semantic parser 132 performs semantic parsing operations on the textual observations to extract features indicative of the state of entities in the monitored environment, e.g., the text-based game, chatbot, or the like. For example, from the textual statement above, a state of "at(agent, kitchen)" and "on (apple, table)" may be generated by extracting these features from the text using semantic parsing by the semantic parser 132.

The semantic parser 132 generated state information is input to a model-based NS computer model 134, where again "model-based" means that the NS computer model uses a world model, or transition model, in addition to other inputs to perform machine learning training and generate decisions during runtime operation. The model-based NS computer model 134, in the text-based game example implementation, generates a decision for an agent in the monitored environment 110 to perform an action, where this decision seeks to maximize the positive outcome (or "reward") or achieve a specified goal, e.g., the apple being on the cupboard may be the specified goal with the determined action being picking the apple up off the table. The determined action output by the model-based NS computer model 134 is then used to implement the action in the monitored environment 110 which changes the current state 120 represented by the logical facts, and the process repeats, where a change in state means that the logical facts representing the monitored environment 110 are different from the previous set of logical facts representing the monitored environment due to the action having been performed in the monitored environment 110. It should be appreciated that this process may be followed for each entity and each corresponding state of the entity in the monitored environment 110, with which the agent or other entities in the monitored environment 110 interact, i.e., perform actions.

As will be described hereafter, the illustrative embodiments introduce a world model, e.g., transition model, learning computer tool that implements a neuro-symbolic approach and generates this world model for input to the model-based NS computer model 134 for use in machine learning and runtime decision making so as to improve the machine learning and decision making made by the model-based NS computer model 134. The illustrative embodiments provide a model-based reinforcement learning computing tool 134 which comprises a semantic parser producing logical states, a proprioception computer model for learning logical world models, and a planning system that produces optimal actions in the monitored environment. Each of these primary components will be described in greater detail hereafter. The resulting learned world models inform the decisions made by the planning system so as to more accurately identify optimal actions to be performed in the monitored environment to maximize positive outcomes (rewards) or achieve specified goals within the monitored environment.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As noted above, the illustrative embodiments provide a model-based reinforcement learning (RL) computing tool which learns a world model, e.g., transition model, and uses that world model to improve the machine learning training and runtime decision making made by a planning system, e.g., a neuro-symbolic (NS) computer model. The improved decision making made by the planning system based on the knowledge and information present in the learned world model may be used to determine actions to take within a monitored environment, e.g., a text-based game, a chatbot conversation, a robotic control within a physical environment, or the like.

Figure 2:
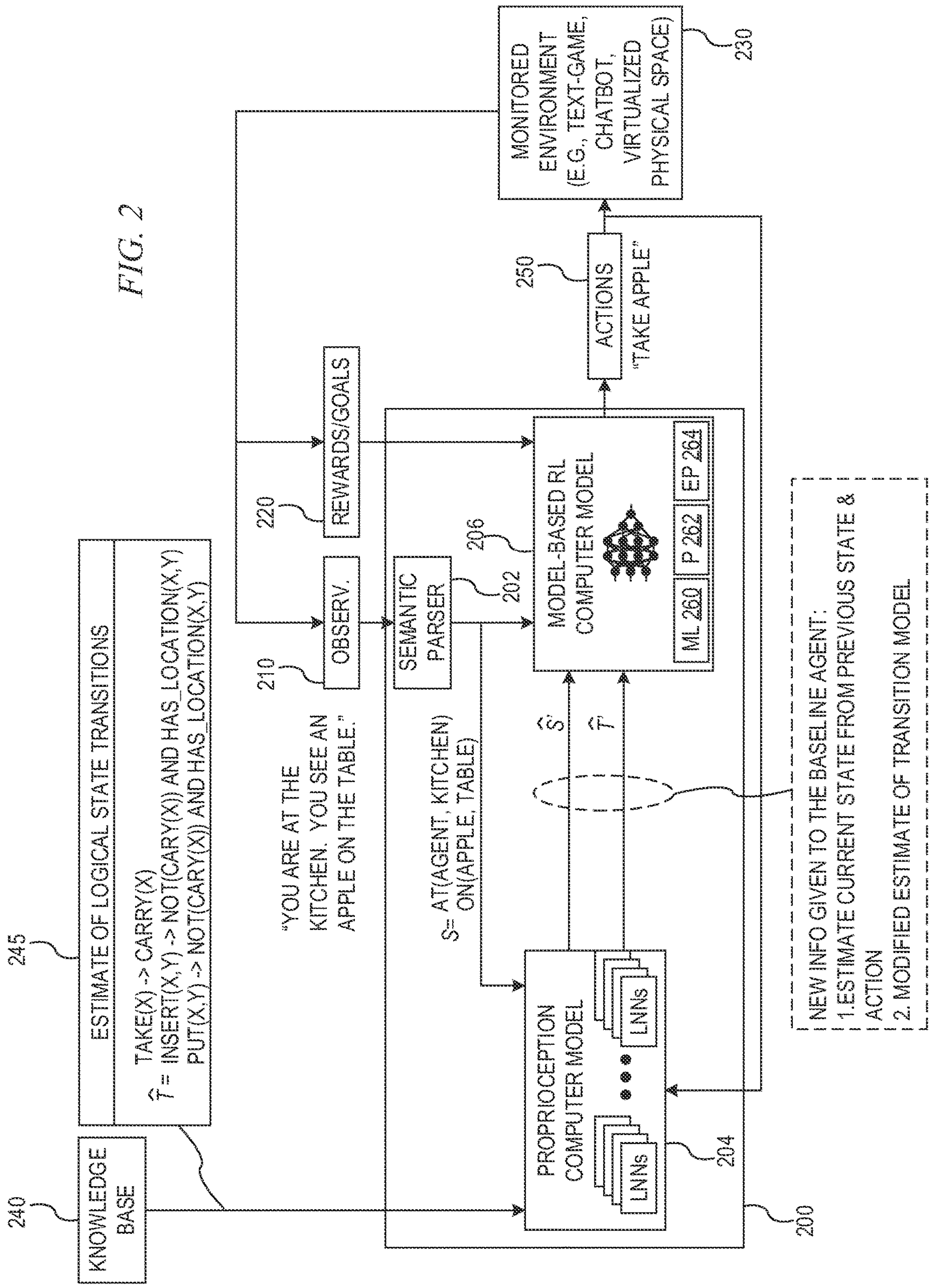
FIG. 2 provides a more detailed flow diagram illustrating the interactions of the primary operational components of a model-based RL computing tool in accordance with one illustrative embodiment.

FIG. 2 provides a more detailed flow diagram illustrating the interactions of the primary operational components of a model-based RL computing tool in accordance with one illustrative embodiment. In some illustrative embodiments, the elements shown in FIG. 2 are implemented in one or more data processing systems with software instructions and data loaded into computer storage devices, such as memory devices, and executed by one or more computer hardware processors to specifically improve the functionality of the one or more data processing systems and specifically improve artificial intelligence (AI) operations performed by these one or more data processing systems. In some illustrative embodiments, one or more of the functionalities attributed to the elements of FIG. 2 may be implemented in dedicated computer hardware devices, such as in the physical logic of the hardware, or as part of firmware of the hardware devices, or may be implemented as any desired combination of software instructions executing on computer hardware and dedicated hardware devices.

In any of the illustrative embodiments, the operation of the elements shown in FIG. 2 are intended to be performed automatically within the one or more data processing systems without human intervention in these operations apart from possibly providing inputs and viewing outputs. That is, while a human being may provide input and make use of the outputs of the illustrative embodiments, the actual operation of the invention is performed automatically without human intervention. Thus, the illustrative embodiments are not directed to any method of organizing human activity. Moreover, the operations of the elements in FIG. 2 cannot be practically performed in the mind of a human being and instead are specifically directed to improving machine learning training and decision making operations performed by machine learning computer models; not mental processes of a human mind.

As shown in FIG. 2, the primary operational components of a model-based RL computing tool 200 in accordance with one illustrative embodiment include a semantic parser 202, a proprioception computer model 204, and a model-based RL computer model 206. The model-based RL computing tool 200 operates on observations 210 and rewards/goals 220 obtained from a monitored environment 230, which in this example is considered to be a text-based game used to train the model-based RL computer model 206. The model-based RL computing tool 200 further operates on one or more knowledge base data structures 240 which specify an initial estimate of the logical state transition model T of the monitored environment 230. The transition model T specifies states and transitions between states for entities within the monitored environment 230. This is an initial estimate of the logical state transition model T which is then expanded and learned over time by the proprioception computer model 204 as discussed hereafter. The model-based RL computer model 206, based on the updated state and transition models from the proprioception computer model 204, the current state obtained from the semantic parser 202, and the historical reward data and/or specified goals 220 from the monitored environment 230, generates decisions as to actions 250 to take within the monitored environment 230 to maximize rewards and/or achieve a specified goal. In some illustrative embodiments, the "rewards" may be a change in state in the transition model, for example, or a new change in state that may be added to the transition model.

To better understand the operation of these elements, it is first beneficial to have an understanding of the problem addressed, followed by a discussion of the basis for the configuration shown in FIG. 2. The following discussion of the problem addressed and basis for the configuration in FIG. 2 will again assume a text-based game implementation used to train the model-based RL computer model 206.

With regard to the definition of the problem addressed, it should be appreciated that text-based games are modelled with the RL problem setting in mind as Partially Observable Markov Decision Processes (PO-MDP). That is, a Markov Decision Processes (MDP) has a "Markov" assumption wherein the process needs to be provided with the complete current state (and not track the history of states) to make a correct action decision. However, this is a restricting assumption which can be relaxed into the Partially Observable MDP (PO-MDP) which has "partial observability". The PO-MDP has "observations" instead of "states" which allows for missing information about the true state, but with the ability to infer the state given a history of observations.

For example, in a customer service chatbot environment, the following scenario may occur in which an observation (as seen by the chatbot but coming from customer) may be of the type "My laptop does not turn on". From this observation, a clue is provided about the "state" of the laptop. It is not known what the reason is for the laptop not turning on, but a set of possible "states" may be deduced, e.g., the battery is empty, the power button is stuck, etc. If the "state" were also known, then a recommended action for the customer may be determined. However, because this state is not known from this single observation, it may be necessary to gather more information, such as asking the customer to see if some LED light indicating battery power is on or not, through interactions with the customer. Thus, there is partial observations in this example that do not provide sufficient information to determine the state.

With one or more of the illustrative embodiments, an additional assumption is that the semantic parser 202 can remove partial observability by using the history of observations and thus, perform an MDP operation. At each time step, the model-based RL computer model 206 uses the information in a state s to take an action $\alpha$, which transitions the state to the new state s' according to the state transition function T such that $s'=T(s, \alpha)$. For example, using the chatbot example above with the observation "My laptop does not turn on", a state may be that "the battery is empty" or "the power button is stuck", which may be represented as "empty(battery)" or "stuck(power_button)", for example. An action may be of the type "look at the light indicator" which may be represented as "look(light_indicator)", for example.

While acting in the monitored environment 230, the model-based RL computer model 206 also gets rewards r 220 according to an unknown reward function R such that $r=R(s, \alpha)$. That is, for example, the reward functions are "hidden" but a stream of rewards 220 are provided as the model-based RL computer model 206 generates actions 250 that are performed in the monitored environment 230. While these rewards 220 are provided, the reason for the awarding of these rewards in response to certain actions a being performed is not given because the function R is unknown to the model-based RL computer model 206. For example, using the above chatbot example, consider that the customer has an upvote/downvote button in their user interface, where an upvote is a positive reward and a downvote is a negative reward. To simplify the example, assume that the upvote/downvote is given after each chatbot reply. In this example, one can see the rewards, i.e., the upvote/downvote, but the reward function is not seen, i.e., why the customer provided an upvote or downvote to the chatbot replies. Thus, the reward function R is not known.

In the model-free RL setting, the agent learns a policy or value function which directly governs the actions. However, the illustrative embodiments implement a model-based RL computing tool 200 where the model-based RL computing tool 200 learns a model of the world, which usually consists of both a transition model T and a reward function R. This model can then be used to find the optimal actions 250 to take in the monitored environment 230 to maximize rewards 220 or achieve specified goals within the monitored environment 230, e.g., putting the apple on the cupboard when the apple is currently on the table.

Based on the classical model-based RL setting, the problem has two additional important specifications. First, it is assumed that the monitored environment 230 is relational. This means that all actions and states are composed of relational logic. They may be in the propositional form, but there is also a corresponding "lifted" form that has a consistent meaning. For example, the propositional state, on(apple, table) can be abstracted or lifted into on(x, y) with predicate "on" and the variables (x, y). The first assumption is that all states and actions handled by the model-based RL computer model 206 are in this relational lifted form. This assumption is can be handled as a design specification of the semantic parser 202.

The second assumption is that, in the case of specified goals rather than maximizing rewards, the goal state is given, i.e., what the model-based RL computer model 206 is being asked to accomplish on behalf of the agent, e.g., what the agent is attempting to do, where the "agent" is an actor entity within the monitored environment 230. This allows the proprioception computer model 204 to concentrate only on learning T since R is no longer required for planning by the model-based RL computer model 206 when given the goal state.

For example, using the chatbot example again, assume that the chatbot is limited to only fixing certain problems of certain laptop models, and assume that there is a user interface of the chatbot that allows a customer to select from a list of common problems if they want to use the chatbot for assistance. This list is a list of "goals" that the customer may have for the chatbot. For example, the goal may be "the laptop boots normally". Hence, instead of trying to maximize rewards, e.g., upvotes, the chatbot instead has a specified goal to reach by taking "actions" of chatting back to the customer what to do/try on the customer's end in an attempt to achieve the goal of "the laptop boots normally." Thus, rather than having to learn the reward function R in this instance, the proprioception computer model 204 need only learn T in order to inform the model-based RL computer model 206 with performing decision making as to actions 250 that will advance towards the specified goal.

The problem of learning logical rules that explain a given set of logical examples can be cast into the general problem called Inductive Logic Programming (ILP). ILP is an application of machine learning to logic programming such that general logical rules can be inferred that govern a given set of logical statements as the training data.

Thus, what needs to be done is then to cast the model-based RL problem into an ILP form so that ILP mechanisms may be implemented. However, it is important to note that relying on classical ILP has significant failings. In particular, it is not well suited to noisy data to the extent that a single erroneous data point may cause the whole system to fail. Newer methods that leverage neural networks have shown great promise on working even with noisy data. These are sometimes called neural ILP, differentiable ILP, or neuro-symbolic ILP. These methods often use weights together with rules. This relaxation from the binary nature of classical logic gives several advantages, such as the training of these weights by backpropagation, representation as a neural network, and some resistance to noisy data.

The illustrative embodiments may make use of such neural ILP mechanisms that are noise-resistant, such as in one or both of proprioception computer model 204 and model-based RL computer model 206, which may be implemented as a Logical Neural Network (LNN) based Neuro-Symbolic AI framework. In the depicted example, the LNNs are shown as part of proprioception computer model 204 but may also be implemented as the neural network(s) shown in model-based RL computer model 206. The LNN based framework provides an end-to-end differentiable system that enables scalable gradient-based learning and has a real-valued logic representation of each neuron that enables logical reasoning.

With regard to expressing the relational model-based RL problem as an ILP problem, data samples are first gathered, which are triples of lifted logic (s, α, s'). The data samples are gathered by implementing, in the model-based RL computer model 206, an exploration policy to generate actions. That is, the model-based RL computer model 206 has three primary sub-blocks of logic including model learning (ML) logic 260, planning (P) logic 262, and exploration policy (EP) logic 264 which implements an exploration policy to generate actions. The exploration policy logic 264 implements the exploration policy while the model learning logic 260 is involved in machine learning. The planning logic 262 is used after learning has been performed and the learned computer model is providing sufficiently good results, as accomplished through the machine learning. The exploration policy implemented by the EP logic 264, in one illustrative embodiment, uniformly randomly samples the action space, i.e., the set of all possible actions that an entity (e.g., the agent) can take within the monitored environment 230, as defined by the monitored environment 230, but other exploration methods that may be readily apparent to those of ordinary skill in the art in view of the present description may be used without departing from the spirit and scope of the present invention. This data collection may be done in an offline or online reinforced learning (RL) setting, but it is assumed that a large enough batch is available in the online RL setting before the learning procedure is started.

Given a batch of data samples, e.g., the triplets (s, α, s'), the learning procedure produces an estimate of the transition model T which is the hypothesis generated by the ILP mechanisms. To make learning more efficient the definition of T may be narrowed down based on the fact that the learned T will be used for planning, i.e., generating a path or sequence of actions that will lead from an initial state to a specified goal given the initial state, the specified goal, and the transition model T. In some illustrative embodiments, the transition model T is defined in a programming language for planning problems, such as PDDL or Stanford Research Institute Problem Solver (STRIPS). In a STRIPS based definition, the transition model T may be defined with STRIPS-like operators that specify preconditions and effects for action transition models as logical statements, e.g., where each operator is a quadruple of (α, β, γ, σ). Each element is a set of logical conditions where α are conditions that must be true for the action to be executable, β are conditions that must be false, γ are conditions made true by the action, and σ are conditions made false by the action. These conditions are the lifted logic statements that comprise a state s, and the set of all possible conditions is P.

That is, the transition model T encompasses all transitions and is composed of several action operators. Each action operator can be broken down into the components (α, β, γ, σ). Each of the action operator components α, β, γ, and σ are modeled as an LNN conjunction whose inputs are P, e.g., a logical conjunction or logical AND where the LNN implements the logic operators/logic gates in neural networks. Thus, each action is modeled by 4 LNN conjunctions, in this example, and each LNN conjunction corresponds to one of the components α, β, γ, and σ, such that if T is comprised of Y different actions, then there are a total of 4Y LNN conjunctions to be trained, where these LNNs may be present in the model-based RL computer model 206, for example.

The LNN learning procedure can learn weights for each of the possible logical facts (inputs), e.g., AT(Agent, Kitchen) and ON(Apple, Table), from the states extracted by the semantic parser 202 from the observations 210 using semantic parsing, which correspond to real-valued logic, i.e., numerical values of varying degrees of truth/falsity, e.g., 1.0 being completely true, 0.0 being completely false, and degrees of truth being anywhere between 0.0 and 1.0. For the LNNs of α and β, the inputs, or logical facts, that are input to the LNNs are given the corresponding logical values of the conditions in s. For example, using the example shown in FIG. 2, s={at(agent, kitchen), on(apple, table)}, using logical values where TRUE=1.0 and FALSE=0.0, possible combinations of the conditions and their logical values include: at(agent, kitchen)=1.0, on(apple,table)=1.0, the rest are 0.0; at(agent, apple)=0.0, at(agent, table)=0.0, . . . ; and so on for all possible combinations. The output of the LNN is true when action α corresponds to the action taken by the agent, e.g., the action selected as an output action by the model-based RL computer model 206 and s≠s', otherwise it is false. This means that even an action taken can be labelled false if the state remained the same when the action was taken. The "agent" is any entity, e.g., computer, living being, or the like, that can perform an action that transforms the monitored environment 230.

For the LNNs of γ and σ, the inputs, i.e., possible logical facts from the states, are given the logical values corresponding to the difference in the conditions of s and s' such that γ are the conditions made true and σ those that are made false by the action α causing the transition from s to s'. The output is true when action α corresponds to the action taken by the agent, otherwise it is false.

Using these inputs to the LNN and the outputs, gradient-based optimization can be used for supervised learning. That is, training data is provided to generate the inputs to the LNN during the "exploration" phase of RL training. When the model-based RL computer model 206 is run during this phase, it takes actions according to the exploration policy discussed above, such as randomly picking any action from the available action space. Each training data sample has a structure {state, action, next_state}, or (s, α, s') as discussed above. To train the LNN on this, the structural limits discussed above are imposed in the form of the 4 LNNs for α, β, γ, and σ. The actual training of the LNNs may be performed using any suitable known logical neural network training methodology, or later developed logical neural network training methodology, such as those described in Sen, Prithviraj, et al. "Neuro-symbolic inductive logic programming with logical neural networks." *Proceedings of the AAAI Conference on Artificial Intelligence*, Vol. 36. No. 8. 2022 or Riegel, Ryan, et al. "Logical neural networks." arXiv preprint arXiv:2006.13155 (2020), for example.

When learning converges, the result is a set of weights for each of the corresponding components α, β, γ, and σ for each action. Each action may have a separate α, β, γ, and σ, and each of these can be learned separately. The weights are in the conditions of the rules. Thus, for example, the rule for a may look like the following: α←w0 at(x,y)^w1 on(x,y), where w0 and w1 are the weights to be learned. These rules can be quite long depending on the number of variables and combinations, with this being a simplified example for purposes of illustration. Each of these α, β, γ, and σ are defined by the input conditions, as shown in the above examples. The values of the components may be interpreted as probabilistic transitions. In some illustrative embodiments, these component values may have threshold values applied to convert these probabilistic values to deterministic values to maintain a deterministic transition system for the final estimate of T', e.g., if a value is 0.9 and the threshold is 0.7 or higher for the value to indicate "true", then by applying the threshold, the 0.9 value can be converted to a "true". T is defined by α, β, γ, and σ which in turn are defined by the weights of the rules of each of these, such that learning the weights updates T into T'. The value $\hat{s}'$ is the next state, and is obtained by $\hat{s}'=T(s,\alpha)$.

Given this transition model T' and the goal, planning mechanisms, such as the planning logic 262 of the model-based RL computer model 206, may be used to find a series of actions to reach the goal. For example, given an initial state, a goal state, and transition model T, all possible states from the initial state at the next time instances may be enumerated. This is like a tree of possible states with the corresponding action that led to it. This tree can then be searched to find a path to the goal state.

The proprioception computer model 204 seeks to produce a quick estimate of the next state given an initial state and initial guess of the transition model. These estimates do not need to be perfect. The proprioception computer model 204 also seeks to improve the transition model estimate given the stream of new state and action information. In some illustrative embodiments, the transition model is a set of rules such that getting the next state estimate is done by applying these logic rules of the action effects to get the next state. The proprioception computer model 204, or proprioception module 204, also tracks the last action tried by a special rule for that action. The transition model is improved by getting the difference of the actual next state and the previously estimated next state. The difference is then used to determine which part of the transition model rules should be changed. The illustrative embodiments can also be enhanced, for example, by tracking more of the history to determine the model changes over a longer time period.

With the above in mind, again with reference to FIG. 2, the operation of the model-based reinforcement learning (RL) computer tool 200, during a training operation, involves obtaining a initial estimate of the logical state transitions of entities in the monitored environment 230 as one or more initial transition models T from the knowledge base 240, which again may be one or more knowledge graph data structures comprising nodes representing entities and edges representing relationships between entities. For example, from the knowledge base 240 an initial transition model T 245 is generate that comprises transitions such as take(x)→carry(x); insert(x, y)→NOTcarry(x) AND has_location(x, y); Put(x, y)→NOTcarry(x) AND has_location(x, y), etc. These transitions may be specified as a state diagram type data structure or as a programmatic language based model. The initial transition model T may be generated manually from the knowledge base 240 or by using automated tools that automatically analyze the knowledge base 240 and extract these transitions from the hierarchical knowledge represented in the knowledge base 240.

In addition, observations 210 and prior rewards/goals 220 are obtained from the monitored environment 230, e.g., a TextWorld environment, historical chatbot conversations, a virtualized version of a physical environment for robotic control implementations, or the like, where these observations 210 may be in terms of textual descriptions of a current state of the environment 230, e.g., "You are at the kitchen. You see an apple on the table." The semantic parser 202 receives these observations 210 and performs semantic parsing on these observations to generate logical facts from these observations 210, such as "at(agent, kitchen)" and "on(apple, table)", which in combination represent a current state s. This current state s is input to the proprioception computer model 204 which operates to learn the world model, or transition model T', from the initial transition model T, the logical facts from the observations 210, and actions taken that cause a change in these logical facts, e.g., (s, α, s') in accordance with one or more of the example implementations discussed above. Moreover, the proprioception computer model 204 stores, in an associated memory, past state-action pairs and labels these past state-action pairs in the memory as valid if a change in the next state was induced, and invalid if no change was observed. Thus, the proprioception computer model 204 is able to identify whether a current state obtained from the semantic parser 202 represents a change in state from a previous state, i.e. a state prior to performance of the action, induced by an action taken, where the change is represented by a difference between the previous state, e.g., logical facts describing the monitored environment prior to performance of the action, and the current state, e.g., logical facts describing the monitored environment after performance of the action.

The proprioception computer model 204 uses a set of LNNs for each action to learn the weights associated with logical facts extracted by the semantic parser, e.g., the weights associated with each of α, β, γ, and σ for each action in the action space of the environment 230. The proprioception computer model 204, based on the weights, generates an estimate of the current state from a previous state and action. In addition, the proprioception computer model 204 generates a modified estimate of the transition model(s) T' as discussed above.

These estimates of the current state S and transition model T' are input to the model-based RL computer model 206 along with the logical facts extracted by the semantic parser 202 and the given goal 220. Based on these inputs, and the reinforcement learning (RL) of the computer model 206, the model-based RL computer model 206 generates a recommended action 250 for performance in the monitored environment 230, e.g., inputting a textual command or textual response stating "take apple" for example, in order to achieve a given goal 220 of placing the apple on a cupboard for example. This determination is based on the understanding of the transitions between states given in the modified estimate of the transition model(s) T' and the current estimate of the state which is correlated with the transition model(s) T' along with the logical facts from the semantic parser 202. That is, knowing that one is trying to reach a given goal of a location of the apple, and knowing the current state of the apple, and knowing the state transitions that can lead to the given goal from the current state, the model-based RL computer model 206 predicts an action, or sequence of actions, that will most likely result in the given goal being achieved, and minimizing the number of actions used to achieve that given goal.

Machine learning training of the model-based RL computer model 206 trains the model 206 on such inputs to recognize patterns in the input and then, for each action in the action space, generate a probability that the action is a correct action to take in the monitored environment 230. Based on these probabilities, an action is selected as a recommended action, e.g., a highest probability or highest ranking action, that is then used to issue a command or generate an input to the monitored environment 230. For example, a textual input may be generated of the type "take apple" which causes a change in state of the monitored environment, and the process repeats with the new observations 210 and updated rewards/goals 220 showing the reward of having performed the action specified in the textual input. Similarly, in a chatbot environment 230, a responsive action may be taken to respond to a users input by providing a textual, or in some cases voice, response in a conversational manner.

Thus, the illustrative embodiments provide a mechanism for providing an artificial intelligence (AI) machine learning based computer tool to automatically learn a world model, e.g., a transition model, that represents the states and transitions between states associated with actions in an action space of a monitored environment 230 with regard to entities in the monitored environment. This learned world model is used as an input to a model-based reinforcement learning computer model that makes planning decisions based on these inputs to take actions to achieve a desired goal or maximize rewards within the monitored environment 230. The knowledge of the world model improves the decisions made as it leverages knowledge of how actions will change the state of elements in the monitored environment when determining how to achieve goals/rewards rather than using a model-free approach that relies only on the current state of the environment 230.

Figure 3:
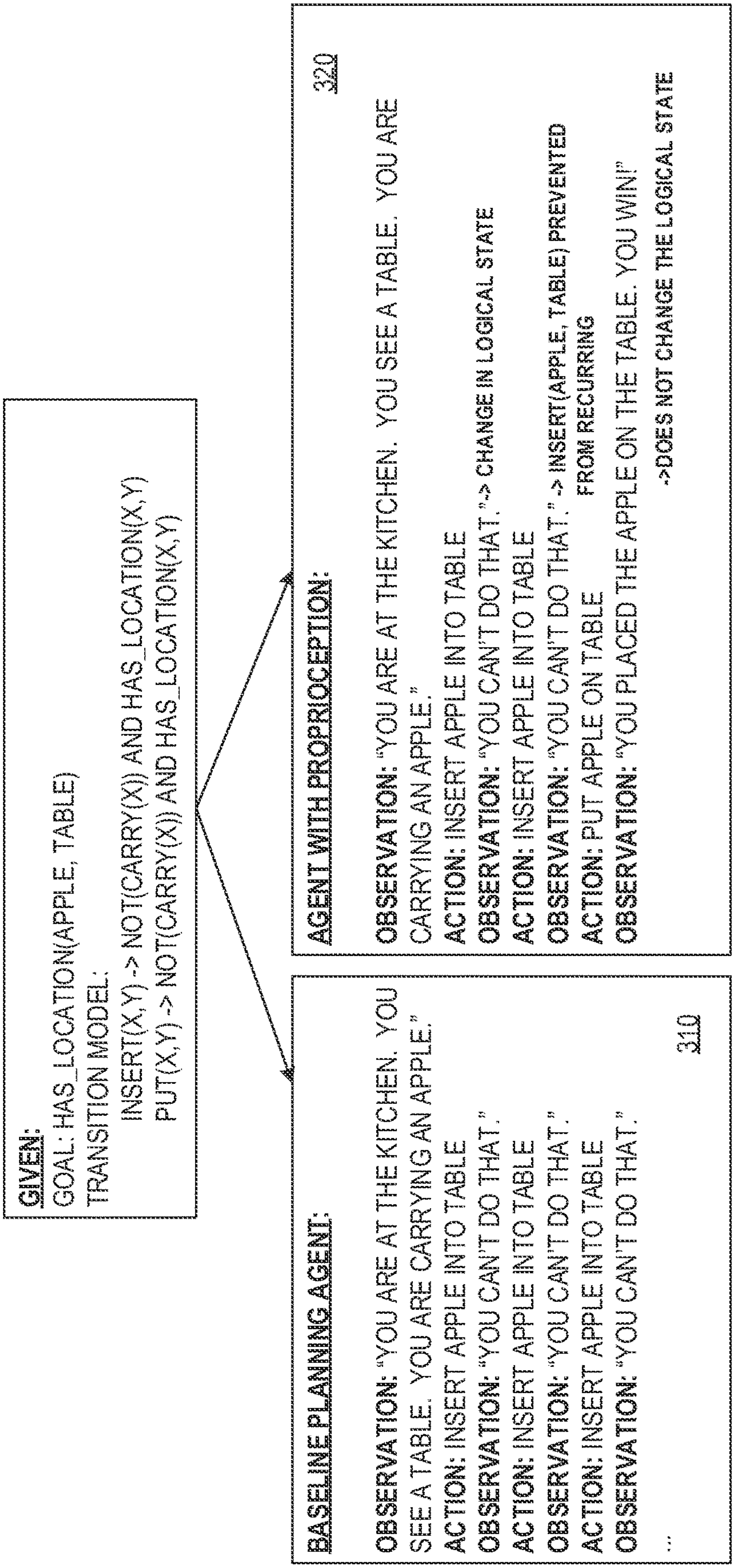
FIG. 3 is an illustrative example showing the difference between a model-free approach to planning actions in a text-based game and a model-based reinforced learning computer model approach to planning performed in accordance with one illustrative embodiment.

FIG. 3 is an illustrative example showing the difference between a model-free approach to planning actions in a text-based game and a model-based reinforced learning computer model approach to planning performed in accordance with one illustrative embodiment. As shown in FIG. 3, in this simplified example, assume that a goal is given of the apple being on the table, i.e., "goal: has_location(apple, table)" and that the transitions corresponding to actions in an initial transition model T are as shown, i.e., "Insert(x, y)→NOT(carry(x)) AND has_location(x, y)" and "Put(x,y)→NOT(carry(x)) AND has_location(x, y)".

With this goal and initial transition model provided, the sequence 310 shows a sequence of observations and resulting recommended action that may be generated by a model-free RL computer model. As shown, the sequence starts with an initial observation of the state of the environment, i.e., "You are at the kitchen. You see a table. You are carrying an apple." The model determines that the recommended action for achieving the goal of the apple being on the table is to "insert apple into table". In response to this action being input to the environment, the environment responds with the observation "You can't do that". However, this observation does not change the recommended action, as there is no world model to inform the model-free approach that an apple cannot be inserted into a table. That is, the policy is fixed and the state does not change so the same action results. Thus, the model-free approach continues to generate the action "insert apple into table". As a result, the model-free RL computer model is not able to achieve the goal and gets stuck with trying to insert the apple into the table.

On the other hand, the illustrative embodiments, implementing a proprioception computer model 204, that learns a world model or transition model, and provides that world model as input to the model-based RL computer model 206, as part of the sequence 320, sees the same initial observation and also generates an action of "insert apple into table". Again, the environment responds with the observation "You can't do that." This produces a change in the logical state which is extracted by the semantic parser and provide as input to the proprioception computer model and the model-based RL computer model. As this is a change in state, the model-based RL computer model again attempts to "insert apple into table" since the logic in the proprioception computer model 204 tracks the previous actions and needs to detect the previous action with the result "no logic change in the state" being detected before changing the recommended action. The environment responds with "You can't do that", which is not a change in logical state. This lack of change in state is recognized by the proprioception computer model and the transition model is used to select an alternative action that may lead to the goal, e.g., "Put apple on table". The environment responds with "You place the apple on the table. You win!"

As described above, the illustrative embodiments of the present invention are specifically directed to an improved computing tool that automatically learn a world model, e.g., a transition model, for a monitored environment and improving the decision making operations of a model-based reinforcement learning computer model based on the world model so as to automatically generate recommended actions to be performed in a monitored environment. All of the functions of the illustrative embodiments as described herein are intended to be performed using automated processes without human intervention. While a human being may provide some inputs, e.g., an initial transition model, and may make use of the results generated by the mechanisms of the illustrative embodiments, e.g., recommended actions to perform in a monitored environment, the illustrative embodiments of the present invention are not directed to actions performed by the human being providing such inputs or viewing the results of the processing performed by the automated computer models and computing tool, but rather to the specific operations performed by the specific improved computing tool of the present invention. Thus, the illustrative embodiments are not organizing any human activity, but are in fact directed to the automated logic and functionality of an improved computing tool.

Figure 4:
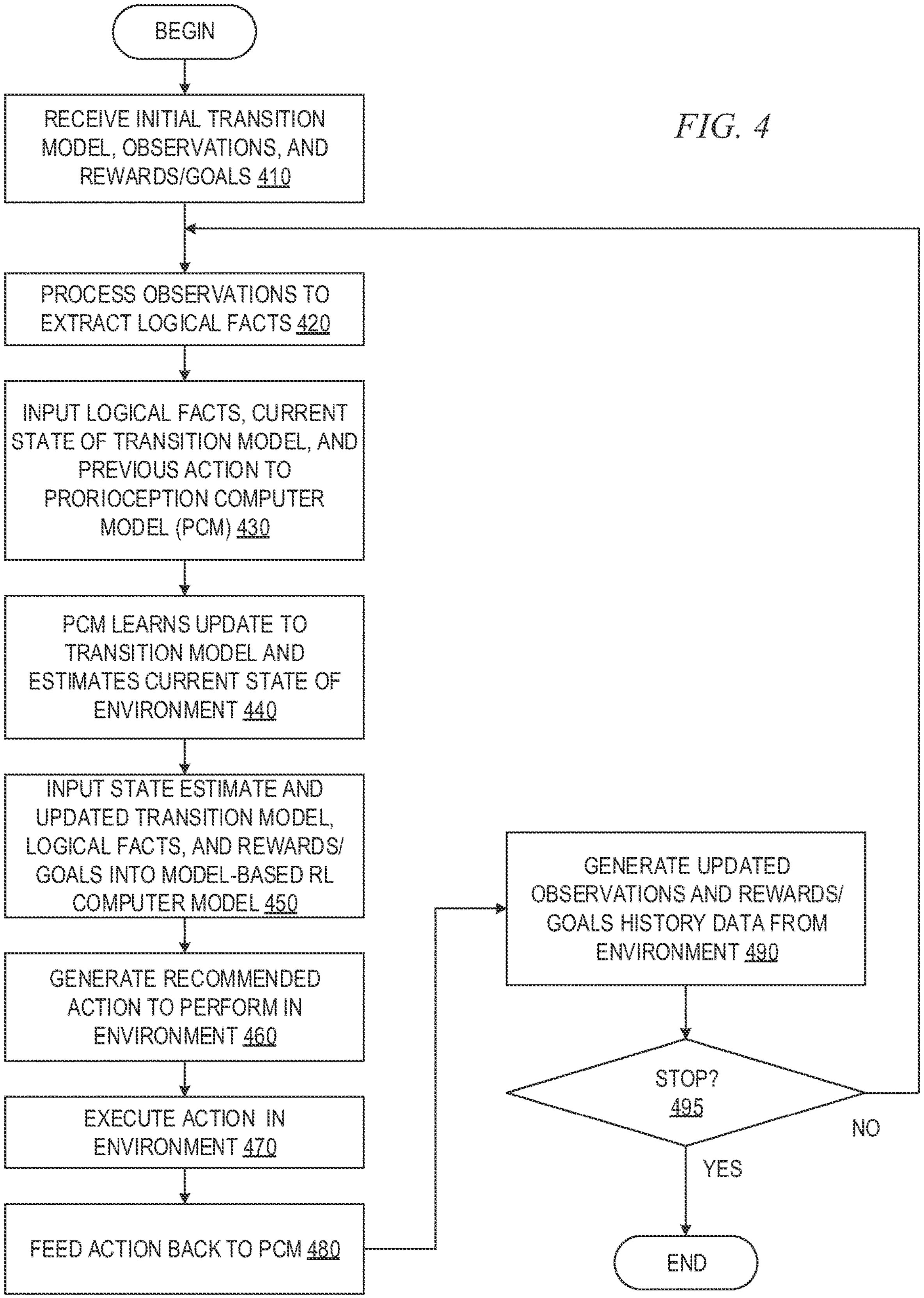
FIG. 4 is an example flowchart outlining an operation of a model-based reinforcement learning (RL) computer tool in accordance with one illustrative embodiment.

FIG. 4 presents a flowchart outlining example operations of elements of the present invention with regard to one or more illustrative embodiments. It should be appreciated that the operations outlined in FIG. 4 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 4, and may, in some cases, make use of the results generated as a consequence of the operations set forth in FIG. 4, the operations in FIG. 4 themselves are specifically performed by the improved computing tool in an automated manner.

FIG. 4 is an example flowchart outlining an operation of a model-based reinforcement learning (RL) computer tool in accordance with one illustrative embodiment. As shown in FIG. 4, the operation starts by receiving an initial transition model for a monitored environment and an initial set of observations and historical rewards/goals (step 410). The current set of observations are processed by a semantic parser to extract logical facts (step 420). The logical facts are input to a proprioception computer model along with the current state of the transition model and a previously recommended action output by a model-based reinforcement learning (RL) computer model (step 430). Based on these inputs, the proprioception computer model learns an update to the transition model and generates an estimate of the current state of the monitored environment based on a previous state and the previous recommended action (step 440).

The estimate of the current state and the updated estimate of the transition model are input to the model-based RL computer model along with the logical facts from the semantic parser and the history of rewards/goals (step 450). The model-based RL computer model processes these inputs to determine, based on the logical facts from the observations, the estimate of the current state of the environment, the transitions between states that are possible as indicated in the transition model, and the history of rewards achieved for previously performed actions and the goals to be achieved, a recommended action to be performed within the environment (step 460). This recommended action is then used to perform the action within the monitored environment (step 470). The recommended action is also fed back to the proprioception computer model as an input (step 480). The performance of the action in the environment causes an update in the observations and/or historical rewards/goals which are provided to the semantic parser and model-based RL computer model (step 490). A determination is made as to whether a stopping criterion is reached, e.g., a goal has been achieved, the text-based game has been won/lost, etc. (step 495). If not, the operation returns to step 420 using the updated observations and rewards from step 490. If a stopping criterion is reached, the operation terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a semantic parser, proprioception computer model, and model-based reinforcement learning computer model that operates to generate improved action recommendations for performance of actions in a monitored environment taking into consideration a world model, or transition model, that represents how actions will change states of elements of the environment. The improved computing tool implements mechanism and functionality, such as the a model-based RL computing tool 200, which cannot be practically performed by human beings either outside of, or with the assistance of, a technical environment, such as a mental process or the like. The improved computing tool provides a practical application of the methodology at least in that the improved computing tool is able to leverage the knowledge of how actions affect the states of elements in a monitored environment, as represented by a world model, or transition model, when AI computer models are evaluating the current state of the environment so as to make more informed decisions of what actions to take to achieve a desired goal or maximize rewards in the monitored environment.

Figure 5:
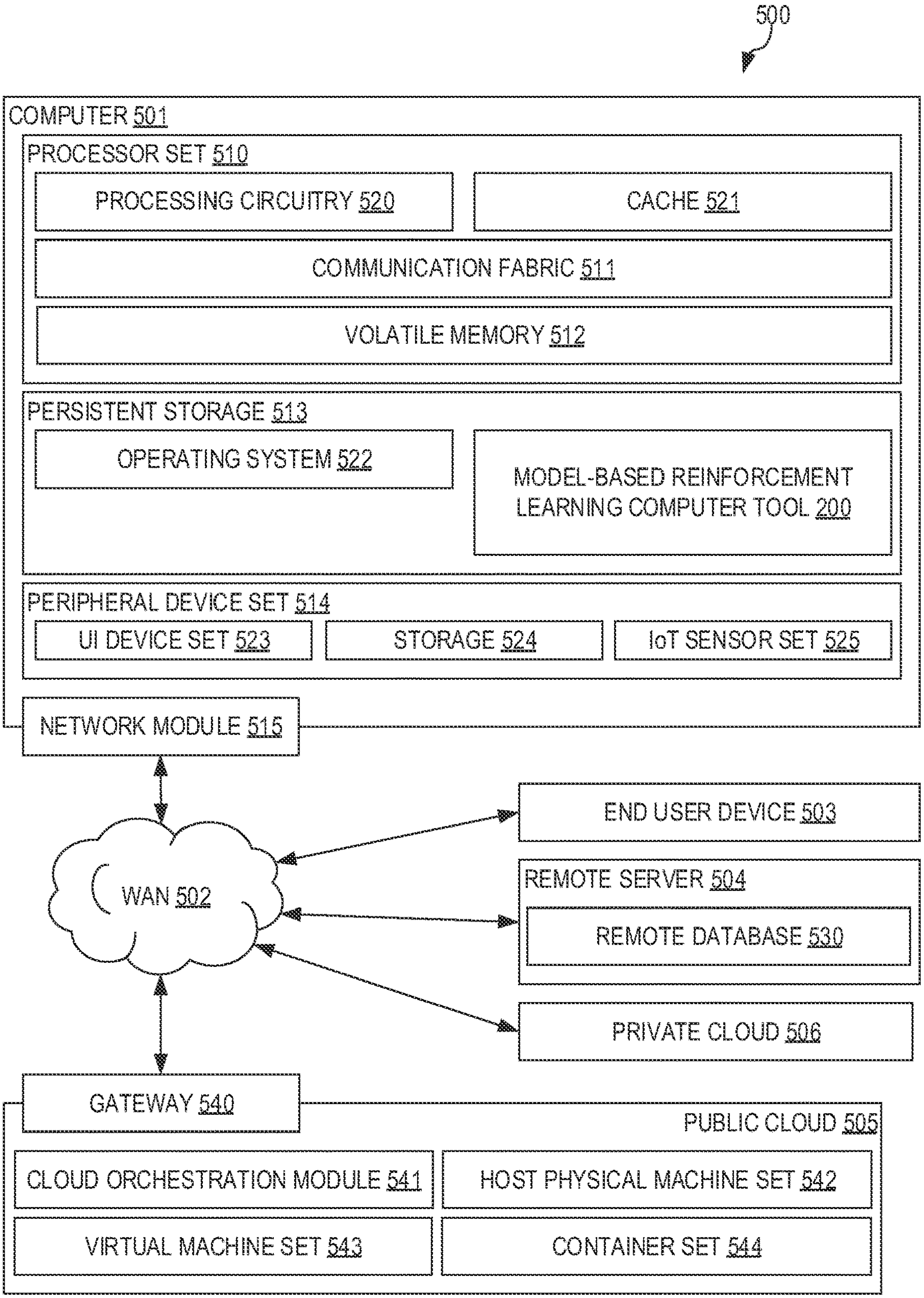
FIG. 5 is an example diagram of a distributed data processing system environment in which aspects of the illustrative embodiments may be implemented and at least some of the computer code involved in performing the inventive methods may be executed.

FIG. 5 is an example diagram of a distributed data processing system environment in which aspects of the illustrative embodiments may be implemented and at least some of the computer code involved in performing the inventive methods may be executed. That is, computing environment 500 contains an example of an environment for the execution of at least some of the computer code involved in performing the inventive methods, such as a model-based reinforcement learning (RL) computer tool 200. In addition to block 200, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 200, as identified above), peripheral device set 514 (including user interface (UI), device set 523, storage 524, and Internet of Things (IOT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 200 in persistent storage 513.

Communication fabric 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 200 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

As shown in FIG. 5, one or more of the computing devices, e.g., computer 501 or remote server 504, may be specifically configured to implement a model-based RL computing tool 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 501 or remote server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates world model based reinforcement learning for making better informed decisions as to actions to take in a monitored environment to achieve a desired goal and/or maximize rewards.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by a proprioception module, a previous state of a monitored environment and a previous action taken by an agent in the monitored environment;

receiving, by the proprioception module, updated observations from the monitored environment after performance of the previous action and determining, from the updated observations, an observed current state comprising logical facts of the monitored environment;

estimating, by the proprioception module, an estimated current state from the previous state and the previous action using a logical transition model which receives a state-action pair and produces a next state, wherein the logical transition model is defined by action operators specifying preconditions and effects as logical statements, and wherein the proprioception module maintains an estimate of the logical transition model;

storing, by the proprioception module, past state-action pairs in a memory and labeling a past state-action pair in the memory as valid if a change between a state before performance of an action and an observed state after performance of the action is observed, and as invalid if no change is observed;

determining, by the proprioception module, a difference between the observed current state and the estimated current state for the previous state and the previous action;

modifying, by the proprioception module, the estimate of the logical transition model by using the difference to determine which part of one or more rules of the logical transition model corresponding to the previous action is to be changed, so that a past action in a stored past state-action pair labeled invalid is prevented from recurring in a corresponding state;

passing, by the proprioception module, the estimated current state and the modified estimate of the logical transition model to a model-based reinforcement learning (RL) computer model for generation of a next action in the monitored environment;

executing the next action in the monitored environment; and receiving, by the proprioception module, further updated observations from the monitored environment after execution of the next action.

2. The computer-implemented method according to claim 1, further comprising:

converting, by a semantic parser, each state and each action in natural language form into corresponding states and actions in logical form; and converting, by a natural language generator, each state and each action in logical form into corresponding states and actions in natural language form.

3. The computer-implemented method according to claim 1, wherein the model-based RL computer model is trained, via a machine learning training operation, to generate a probability value for each action in an action space based on patterns in input data, wherein the input data comprises the estimated current state and the modified estimate of the logical transition model.

4. The computer-implemented method according to claim 3, further comprising:

executing the model-based RL computer model on the estimated current state and the modified estimate of the logical transition model to generate the next action in the monitored environment; and inputting the next action into the monitored environment as a command for performing a corresponding action in the monitored environment.

5. The computer-implemented method according to claim 3, wherein the model-based RL computer model comprises a logical neural network (LNN) for each action in the action space, and wherein each LNN is trained through the machine learning training operation to determine weights associated with one or more action operator components of a corresponding action.

6. The computer-implemented method according to claim 1, further comprising:

executing semantic parsing on the further updated observations to determine a further observed current state comprising logical facts of the monitored environment; and setting, for a subsequent iteration, the previous state to the further observed current state and the previous action to the next action.

7. The computer-implemented method according to claim 1, wherein the monitored environment is one of: a virtual environment provided by one or more computing systems; or a physical environment monitored by monitoring equipment.

8. The computer-implemented method according to claim 1, wherein the monitored environment is a text based computer game environment or a chatbot environment, and wherein the next action is a natural language textual input.

9. The computer-implemented method according to claim 1, wherein the monitored environment is a physical environment, and wherein the next action is a command to a robotic device to perform the next a corresponding action within the monitored environment.

10. The computer-implemented method according to claim 1, further comprising: feeding the next action back to the proprioception module as an input after execution of the next action.

11. A computer program product comprising a computer readable storage medium having a computer readable program stored therein, wherein the computer readable program, when executed on a data processing system, causes the data processing system to:

receive, by a proprioception module, a previous state of a monitored environment and a previous action taken by an agent in the monitored environment;

receive, by the proprioception module, updated observations from the monitored environment after performance of the previous action and determine, from the updated observations, an observed current state comprising logical facts of the monitored environment;

estimate, by the proprioception module, an estimated current state from the previous state and the previous action using a logical transition model which receives a state-action pair and produces a next state, wherein the logical transition model is defined by action operators specifying preconditions and effects as logical statements, and wherein the proprioception module maintains an estimate of the logical transition model;

store, by the proprioception module, past state-action pairs in a memory and label a past state-action pair in the memory as valid if a change between a state before performance of an action and an observed state after performance of the action is observed, and as invalid if no change is observed;

determine, by the proprioception module, a difference between the observed current state and the estimated current state for the previous state and the previous action;

modify, by the proprioception module, the estimate of the logical transition model by using the difference to determine which part of one or more rules of the logical transition model corresponding to the previous action is to be changed, so that a past action in a stored past state-action pair labeled invalid is prevented from recurring in a corresponding state;

pass, by the proprioception module, the estimated current state and the modified estimate of the logical transition model to a model-based reinforcement learning (RL) computer model for generation of a next action in the monitored environment;

execute the next action in the monitored environment; and receive, by the proprioception module, further updated observations from the monitored environment after execution of the next action.

12. The computer program product according to claim 11, wherein the computer readable program further causes the data processing system to:

convert, by a semantic parser, each state and each action in natural language form into corresponding states and actions in logical form; and convert, by a natural language generator, each state and each action in logical form into corresponding states and actions in natural language form.

13. The computer program product according to claim 11, wherein the model-based RL computer model is trained, via a machine learning training operation, to generate a probability value for each action in an action space based on patterns in input data, wherein the input data comprises the estimated current state and the modified estimate of the logical transition model.

14. The computer program product according to claim 13, wherein the computer readable program further causes the data processing system to:

execute the model-based RL computer model on the estimated current state and the modified estimate of the logical transition model to generate the next action in the monitored environment; and input the next action into the monitored environment as a command for performing a corresponding action in the monitored environment.

15. The computer program product according to claim 13, wherein the model-based RL computer model comprises a logical neural network (LNN) for each action in the action space, and wherein each LNN is trained through the machine learning training operation to determine weights associated with one or more action operator components of a corresponding action.

16. The computer program product according to claim 11, wherein the computer readable program further causes the data processing system to:

execute semantic parsing on the further updated observations to determine a further observed current state comprising logical facts of the monitored environment and set, for a subsequent iteration, the previous state to the further observed current state and the previous action to the next action.

17. The computer program product according to claim 11, wherein the monitored environment is one of; a virtual environment provided by one or more computing systems; or a physical environment monitored by monitoring equipment.

18. The computer program product according to claim 11, wherein the monitored environment is a text based computer game environment or a chatbot environment, and wherein the next action is a natural language textual input.

19. The computer program product according to claim 11, wherein the computer readable program further causes the data processing system to:

feed the next action back to the proprioception module as an input after execution of the next action.

20. An apparatus comprising:

at least one processor; and at least one memory coupled to the at least one processor, wherein the at least one memory comprises instructions which, when executed by the at least one processor, cause the at least one processor to:

receive, by a proprioception module, a previous state of a monitored environment and a previous action taken by an agent in the monitored environment;

receive, by the proprioception module, updated observations from the monitored environment after performance of the previous action and determine, from the updated observations, an observed current state comprising logical facts of the monitored environment;

estimate, by the proprioception module, an estimated current state from the previous state and the previous action using a logical transition model which receives a state-action pair and produces a next state, wherein the logical transition model is defined by action operators specifying preconditions and effects as logical statements, and wherein the proprioception module maintains an estimate of the logical transition model;

store, by the proprioception module, past state-action pairs in a memory and label a past state-action pair in the memory as valid if a change between a state before performance of an action and an observed state after performance of the action is observed, and as invalid if no change is observed;

determine, by the proprioception module, a difference between the observed current state and the estimated current state for the previous state and the previous action;

modify, by the proprioception module, the estimate of the logical transition model by using the difference to determine which part of one or more rules of the logical transition model corresponding to the previous action is to be changed, so that a past action in a stored past state-action pair labeled invalid is prevented from recurring in a corresponding state;

pass, by the proprioception module, the estimated current state and the modified estimate of the logical transition model to a model-based reinforcement learning (RL) computer model for generation of a next action in the monitored environment;

execute the next action in the monitored environment; and receive, by the proprioception module, further updated observations from the monitored environment after execution of the next action.

* * * * *